United States Patent
Hill et al.

[11] Patent Number: 6,016,375
[45] Date of Patent: Jan. 18, 2000

[54] WAVELENGTH SELECTIVE FIBER TO FIBER OPTICAL TAP

[76] Inventors: Kenneth O. Hill, 1 Binning Court, Kanata, Ontario, Canada, K2K 1B2; Mark Farries, 26 Tiverton Drive, Nepean, Ontario, Canada, K2E 6L5

[21] Appl. No.: 08/780,446

[22] Filed: Jan. 8, 1997

[51] Int. Cl.[7] .................................................. G02B 6/34
[52] U.S. Cl. ........................... 385/37; 385/32; 385/129
[58] Field of Search ................................ 385/37, 32, 129, 385/49, 146, 47

[56] References Cited

U.S. PATENT DOCUMENTS

| | | | |
|---|---|---|---|
| 4,425,566 | 1/1984 | Dragone | 343/781 |
| 4,800,557 | 1/1989 | Weber | 370/3 |
| 4,904,042 | 2/1990 | Dragone | 350/96.16 |
| 4,938,553 | 7/1990 | Maerz et al. | 350/96.11 |
| 5,002,350 | 3/1991 | Dragone | 350/96.24 |
| 5,039,993 | 8/1991 | Dragone | 343/776 |
| 5,061,032 | 10/1991 | Meltz et al. | 385/37 |
| 5,136,671 | 8/1992 | Dragone | 385/46 |
| 5,243,672 | 9/1993 | Dragone | 385/46 |
| 5,511,083 | 4/1996 | D'Amato et al. | 372/6 |
| 5,546,481 | 8/1996 | Meltz et al. | 385/11 |
| 5,808,765 | 9/1998 | Laude | 359/130 |

*Primary Examiner*—Hung N. Ngo
*Attorney, Agent, or Firm*—Neil Teitelbaum & Associates

[57] ABSTRACT

Light is coupled out of a first mono-mode optical waveguide such as an optical fiber an into another single mode waveguide through a substantially planar slab waveguide. The first mono-mode optical waveguide has a grating impressed within which has refractive index perturbations that reflect predetermined wavelengths of incident light out of a portion of a side of the optical waveguide adjacent the grating; The slab planar waveguide has an end optically coupled to the portion of the first mono-mode optical waveguide, for guiding light coupled out of the side of the waveguide, and for maintaining a uni-phase wavefront of said light by having a response that confines the light to a single mode in one dimension, and multi-mode in another dimension and allows at least a portion of the light to converge.

9 Claims, 4 Drawing Sheets

WAVELENGTH SELECTIVE FIBER TO FIBER OPTICAL TAP

FIELD OF THE INVENTION

This invention relates to a method and device for coupling light from one optical waveguide to another optical waveguide. More particularly it relates to the coupling of light out of an optical waveguide using a refractive index Bragg grating, then coupling the radiated light into a planar optical waveguide which subsequently couples the light into another optical waveguide. In the preferred configuration for the device the optical waveguides are monomode optical fibers.

BACKGROUND OF THE INVENTION

In order to couple light from a first optical fiber to another optical fiber, it is necessary to perturb the light propagating in the core of the first fiber so that it radiates out of the bound modes. A variety of techniques are available for perturbing the light propagating in the core of an optical waveguide and more particularly an optical fiber; some examples are fiber tapering, fiber bending and in-fiber gratings. The technique for perturbing the light propagating in the core of an optical waveguide of interest in this invention is by using gratings photoimprinted in the optical waveguide core. The advantage of photoimprinted gratings in the fiber core for perturbing the light propagation is that the process is noninvasive; that is, the fiber core and its cladding are not damaged. However, the invention is not restricted to gratings fabricated using light. Alternatively, ratings in the form of periodic corrugations formed using wet or dry etching may also be used.

U.S. Pat. Ser. No. 4,474,427 (K. O. Hill, B. S. Kawasaki, D. C. Johnson and Y. Fujii, "Optical fiber reflective filter", filed May 7, 1979, issued Oct. 2, 1984) disclosed that most glass optical fibers are photosensitive and that light can be used to write permanent refractive index gratings in the core of optical fibers. These gratings subsequently became known as "Hill gratings". U.S. Pat. Ser. No. 4,807,950 W. H. Glenn, G. Meltz, and E. Snitzer, "Method for impressing gratings within fiber optics", filed Nov. 19, 1987 and issued Feb. 28, 1989) showed that the "Hill gratings" could be formed by irradiating the fiber from the side with two intersecting coherent ultraviolet light beams. The two overlapping ultraviolet light beams interfere producing a periodic interference pattern that writes a corresponding periodic index grating in the core of the optical fiber. The technique called the transverse holographic technique is possible because the fiber cladding is transparent to the ultraviolet light whereas the fiber core is highly absorbing to the ultraviolet light. Another technique for photoimprinting index gratings in the core of an optical fiber is the phase mask technique which was disclosed in U.S. Pat. No. 5,367,588 (K. O. Hill, B. Y. Malo, F. C. Bilodeau, and D. C. Johnson, "Method of fabricating Bragg gratings using a silica glass phase grating mask and mask used by same", Filed Oct. 29, 1992, issued Nov. 22, 1994). The phase mask is a flat slab of silica glass that is transparent to ultraviolet light. On one of the flat surfaces, a one dimensional periodic surface relief structure is etched using photolithographic techniques. The shape of the periodic pattern approximates a square wave in profile. The optical fiber is placed almost in contact with the corrugations of the phase mask. Ultraviolet light which is incident normal to the phase mask passes through and is diffracted by the periodic corrugations of the phase mask. Normally, most of the diffracted light is contained in the 0,+1 and −1 diffracted orders. However, the phase mask is designed to suppress the diffraction into the zero-order by controlling the depth of the corrugations in the phase mask. In practice the amount of light in the zero-order can be reduced to less than 5% with approximately 40% of the total light intensity divided equally in the ±1 orders. The two ±1 diffracted order beams interfere to produce a periodic pattern that photoimprints a corresponding grating in the optical fiber. The phase mask technique has the advantage of greatly simplifying the process for photoimprinting Bragg gratings in optical fibers.

In most applications the Bragg gratings are photoimprinted such that the index perturbations are normal to the longitudinal axis of the optical waveguide. Such an index grating in the core of a singlemode optical waveguide has the characteristic of reflecting light at the Bragg wavelength, $\lambda_B$ given by $\lambda_B = 2n_{eff}\Lambda$ where $n_{eff}$ is the effective refractive index of the optical waveguide and $\Lambda$ is the pitch or period of the perturbations in the index grating. The light at the Bragg wavelength is reflected from the grating and coupled back into the bound mode of the optical fiber so that it is now propagating in the opposite direction. Light at wavelengths different from the Bragg wavelength pass through the index grating unperturbed.

If the gratings are photoimprinted in the core of the optical waveguide such that index perturbations are tilted or slanted to the optical waveguide axis, the light reflected at the Bragg wavelength is coupled into higher order modes or into radiation modes. The application of tilted gratings for mode converters was first demonstrated by Hill et al. (K. O. Hill, B. Malo, K. A. Vineberg, F. Bilodeau, D. C. Johnson, and I. Skinner, "Efficient mode conversion in telecommunication fibre using externally written gratings", Electronics Letters, Vol. 26, No. 16, pp. 1270–1272, Aug. 2, 1990). The first demonstration of the use of tilted grating to couple light to the radiation modes was reported by Meltz et al. (G. Meltz, W. W. Morey, and W. H. Glenn, "In-fiber Bragg grating tap", Conference on Optical Fiber Communications, OFC'90, San Francisco, Calif. Jan. 22–26, 1990. Proceedings ofthe OFC'90, Paper TUG1, pp. 24, Jan. 23, 1990). Tilted gratings are the subject of U.S. Pat. Nos. 5, 546,581 and 5,511,083 and have applications as fiber taps and fiber polarizers. It is the capability of tilted or slanted index gratings to couple light to the radiation modes that is relevant for this invention.

A tilted grating in the core of an optical waveguide can couple light from the bound modes to radiation modes; the characteristics of radiated light are important to this invention. For a grating having a period $\Lambda$ (wave number $K_g$) and tilted at an angle $\theta$ ($\theta$ is the angle the wave vector $K_g$ makes with the fiber longitudinal axis), monochromatic light at a wavelength $\Lambda$ (propagation constant $\beta$) is scattered at an angle $2\theta$ where $\theta$ is given by the expression $2\beta \cos \theta = K_g$. This expression is easily obtained by considering the light as plane waves and momentum must be preserved between the incidence wave vector $\beta_{inc}$, the scattered wave vector $\beta_{sca}$ and the grating wave vector $K_g$ with $|\beta_{inc}|=|\beta_{sca}|=|\beta|$. Light having a different wavelength will be scattered at a different angle. Consequently, the tilted grating taps light over a broad range of wavelengths. The distribution of the scattered light is also of interest. In the scattering plane, monochromatic light scattered at an angle $2\theta$ has a very small angular spread about $2\theta$, typical the angular spread is less than a milliradian. However, in the plane normal to the fiber axis the angular azimuthal $\phi$, spread around the fiber axis is much larger, typically of the order of 20 degrees. This description of the radiation of light scattered by a tilted grating in an optical fiber has been somewhat qualitative; a more rigorous treatment of the problem can be found in a paper by Erdogan and Sipe (T. Erdogan and J. E. Sipe, "Tilted fiber phase gratings", Journal of the Optical Society of America, Vol. 13, No. 2, pp. 296–313, February, 1996). An objective of this invention is to take light scattered into the radiation modes by the tilted grating and couple it into another optical waveguide.

An alternative noninvasive method for perturbing the light propagating in the core of an core fiber is to photoimprint the grating using ultraviolet with intensities greater than 1 joule/cm$^2$. (See for example, B. Malo, D. C. Johnson, F. Bilodeau, J. Albert, and K. O. Hill, "Single excimer pulse writing of fiber gratings using a zero order nulled phase mask: Grating spectral response and visualization of index perturbations", Optics Letters, Vol. 18, No. 15, pp. 1277–1279, Aug. 1, 1993). At these high intensities a different nonlinear photosensitive mechanism begins to dominate and a periodic index perturbation is written that is localized to the core/cladding interface. This method for writing index gratings has the advantage that they are formed in a single exposure to high intensity ultraviolet light. Since these index perturbations do not extend throughout the core they cause light in bound modes to radiate to the free space modes.

Another technology relevant to this invention is the planar optical waveguide implementation of "Dragone couplers". The principles underlying these couplers are described in a paper (C. Dragone, "Efficient N X N star couplers using Fourier optics", Journal of Lightwave Technology, Vol. 7, No. 3, pp. 479–489, Mar. 1989) and U.S. Pat. Nos. 4,904, 042, 5,039,993 and 5,136,671. Briefly, the paper and patents teach that efficient coupling between two arrays of N elements can be realized in free space. In practice the free space region is a planar slab waveguide with curved entrance and exit ends. The two curved ends are separated by a distance corresponding to the radius of curvature of the slab ends. Along the curved entrance port of the planar waveguide an array of N optical waveguides are regularly spaced. A similar array of N singlemode optical waveguides are positioned along the output port of the planar optical waveguide. Light launched into one of the singlemode entrance fibers is guided to the planar optical waveguide where it radiates into free space. The free space region has only 2 degrees of freedom since the planar optical waveguide will continue to guide the light in the 3$^{rd}$ dimension. The radiating light illuminates uniformly the N singlemode waveguides positioned on the far side of the slab waveguide. This receiving array is far enough away that the elements are in the far field of the radiation pattern. Using this method, light in a single fiber is divided among several fibers.

It is an object of this invention to a provide a noninvasive means for perturbing the light propagating in an optical waveguide and for coupling the radiated light into another optical waveguide. In the preferred configuration, the optical waveguides have the form of monomode optical fibers.

It is an object of the invention to perturb the light in an optical waveguide using a grating in or in close proximity to the waveguide core thereby causing the light in the core bound modes to radiate into the free space modes. The preferred means for fabricating the grating are noninvasive using photosensitivity.

It is an object of the invention to capture efficiently the light radiated out of the core of the optical waveguide by placing the optical waveguide in close contact to the circularly curved entrance end of a planar optical waveguide that guides and concentrates the captured radiated light on a distal point located one radius of curvature away on the circularly curved exit end of the planar optical waveguide where the concentrated light is coupled into another optical waveguide.

SUMMARY OF THE INVENTION

In accordance with the invention, there is provided, an optical waveguide tap comprising:

an optical waveguide having a grating impressed therein, the grating has refractive index perturbations that scatter predetermined wavelengths of the light propagating in the fiber bound mode(s) into a free space region consisting of a planar optical waveguide having curved entrance and exit ends separated by the radius of curvature, said planar optical waveguide confines efficiently the light radiated by the grating index perturbations to a two dimensional free space region and said grating index perturbations act as a curved array of light sources emitting Huygens wavelets that by means of constructive and destructive inference concentrate the light radiation in the far field at a distal point one radius of curvature away where at said distal point, the concentrated radiation is coupled efficiently into another optical waveguide.

In accordance with the invention, there is further provided, an optical waveguide tap comprising: a monomode optical waveguide having a grating impressed therein, the grating having refractive index perturbations that reflect predetermined wavelengths of incident light out of a portion of a side of the optical waveguide adjacent the grating; and, a substantially planar waveguide optically coupled to the portion of the mono-mode optical waveguide, for guiding light coupled out of the side of the waveguide, and for maintaining a uni-phase wavefront of said light by having a response that confines the light to a single mode in one dimension, and multi-mode in another dimension and allows at least a portion of the light to converge.

BRIEF DESCRIPTION OF THE DRAWINGS

Exemplary embodiments of the invention will be described in conjunction with the drawings in which.

DETAILED DESCRIPTION

Figure 1A:
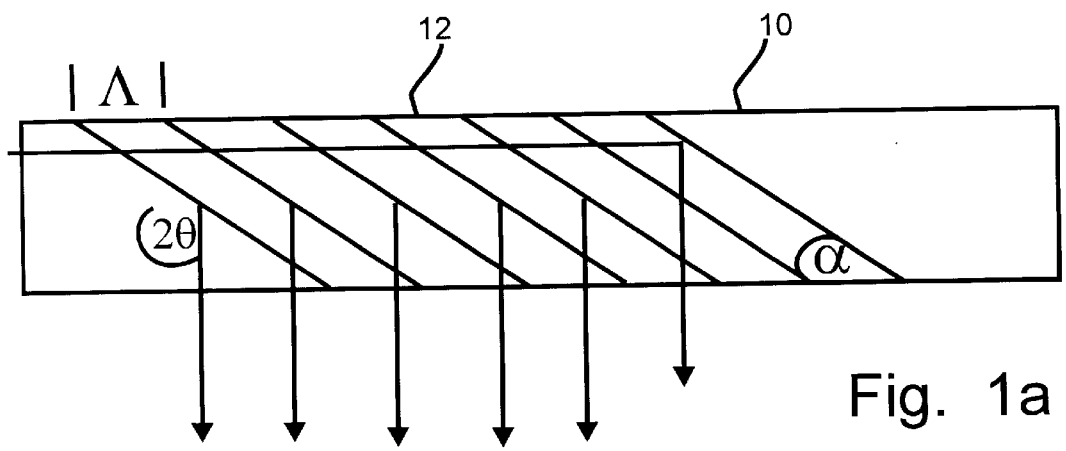
FIG. 1a is a prior art side view illustration of an optical fibre having a Bragg grating impressed therein.
Figure 1B:
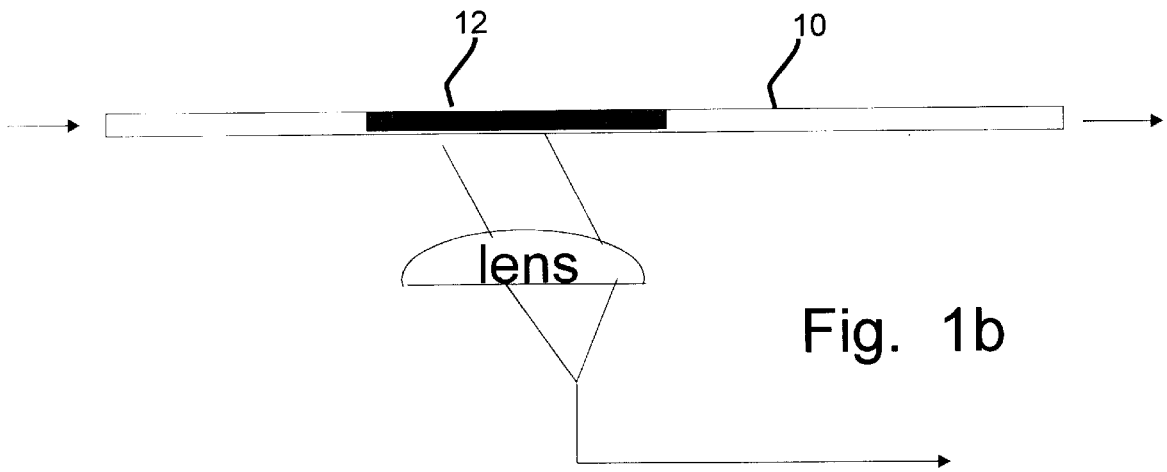
FIG. 1b is a prior art schematic of current means for coupling light from a fiber to another fiber using a s and tilted Bragg gratings.
Figure 2:
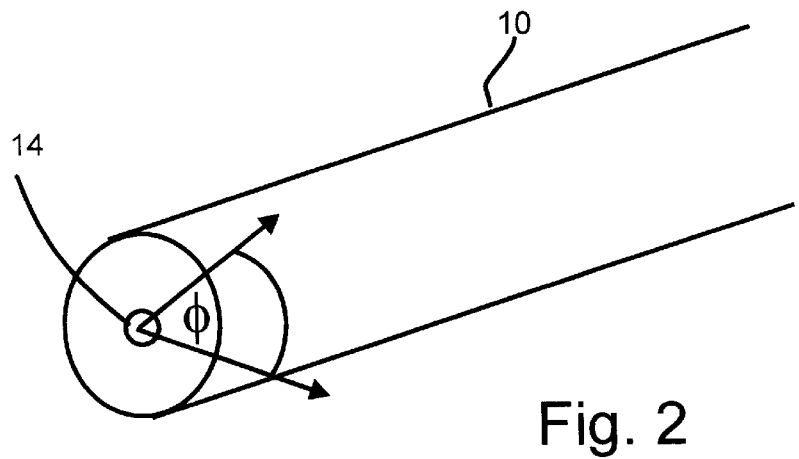
FIG. 2 is a prior art isometric view of the optical fiber shown in FIG. 1 showing radiation being coupled into free space by the gratings having an azimuthal angular spread of φ.

Turning now to FIG. 1a and 1b, an isometric view of a tilted Bragg grating in the core of the optical fiber. The pitch or period of the grating is $\Lambda$, the angle of tilt the index perturbation planes make with respect to the fiber axis is $\alpha$ and angle with respect to fiber axis which light at wavelength $\lambda$ is being radiated out into free space is $2\theta$. In FIG. 1a, an optical waveguide is shown in the form of an optical fiber having a slanted Bragg grating 12 impressed therein. The planes of the grating perturbations are slanted at an angle $\alpha$ with respect to the fiber axis; the angle $\alpha$ is sufficiently large to allow light of a predetermined wavelength $\lambda$ to be reflected outward through the cladding/core and cladding/air interfaces into free space. As indicated by the direction of the arrows, the light is scattered at an angle $2\theta$ with respect to the fiber axis when viewed in the plane containing the fiber axis and the normal to the grating perturbations. This scattering angle depends on the period $\Lambda$ of the grating and the wavelength $\lambda$ of the light as described previously. As shown in FIG. 2, the scattered light is radiated into a pattern having an angular azimuthal spread of $\phi$. Further refraction of the scattered light occurs as it passes through the core/cladding and cladding/air interfaces thus affecting the values of $2\theta$ and $\phi$ when measured in free space.

Although light of predetermined wavelengths can be relatively efficiently coupled out of the optical fiber 10, devices for capturing this light or directing it into another monomode optical waveguide without significant loss are heretofore not known. As shown in FIG. 1b, the conventional method utilized a lens to focus and redirect the radiated light into another optical waveguide either through the end of the waveguide or by means of second grating located in another optical waveguide. One drawback to this method is the large angular azimuthal spread of the radiated light. The tilted gratings embedded in the fiber core act as a radiating pseudo line source having a physical width of the fiber core diameter, d. Consequently, the light is diffracted and fans out with an angular spread given by the Rayleigh criteria $\phi=\lambda/d$. Since the core diameter is of the order of a few microns, $\phi$ is large making it difficult at substantial distances from the fiber core to collect all of the radiated light. In principle, since the light radiation initially has characteristics of a uniphase wave front, relatively efficient coupling of the radiated light into a monomode optical waveguide is possible in accordance with the teachings of this invention.

Figure 3:
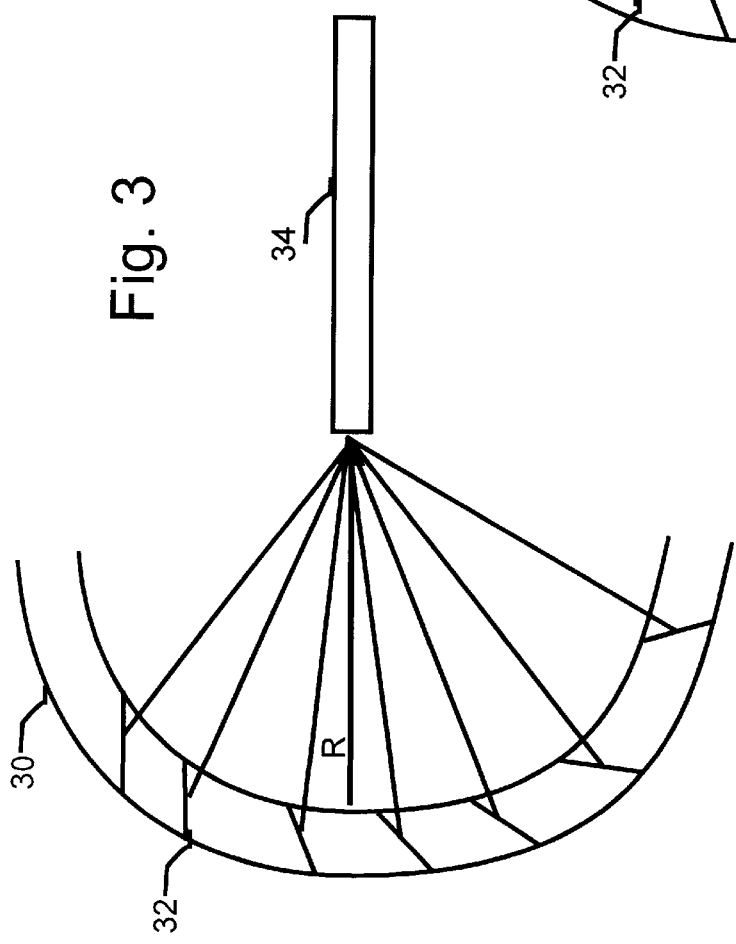
FIG. 3 shows fiber in FIG. 2 positioned so that along the section of the fiber containing the tilted index gratings, the fiber axis follows the arc of circle having a radius R thereby concentrating the radiated light at a point a distance R away where a second optical waveguide is disposed.

FIG. 3 illustrates the principles of focusing at a distal point by a circular array of radiating light sources in which the radiating elements are the index perturbations of a tilted Bragg gratings in the core an optical waveguide. The optical waveguide 30 having a tilted Bragg grating 32 therein is configured to form the arc of a circle having a radius of curvature R. Light of wavelength $\lambda_1$ launched into a waveguide 30 is scattered by the Bragg grating 32 and is directed in towards center of the circle. The index perturbations of the tilted grating can be viewed as elements of an array of light sources on a curved surface radiating into free space. For the purposes of this discussion, the analysis will be restricted to considering only the light radiated within the two dimensional plane defined by the curved optical waveguide. The light intensity at any point in the far field is the coherent sum using Huygens principle of the light radiated by each of the elements in the array. Because of the circular geometry of the array, the light intensity in the far field is approximately a finite Fourier transform of the light emitted by the elements of the array. Consequently there is a distal point, 31 one radius of curvature away, where a substantial portion of the emitted light is concentrated or focused. By placing an optical fiber 34 with its end located at the distal point, 31 a substantial portion of this concentrated light can be coupled into the fiber 34. Note that light of a different wavelength $\lambda 2$ launched into the waveguide 30 and scattered by the Bragg grating 32 is concentrated at a different distal point, located in the far field one radius curvature away.

Consider now the light that is radiated out of the plane. For the same reasons as described heretofore, this light is concentrated along a circular arc that is normal to the plane defined by the irradiating curved fiber. This light is however lost because it is not captured by the fiber 34 located at the distal point 31. A means by which this out of plane radiation can be captured is shown in FIGS. 4 and 5.

Figure 4:
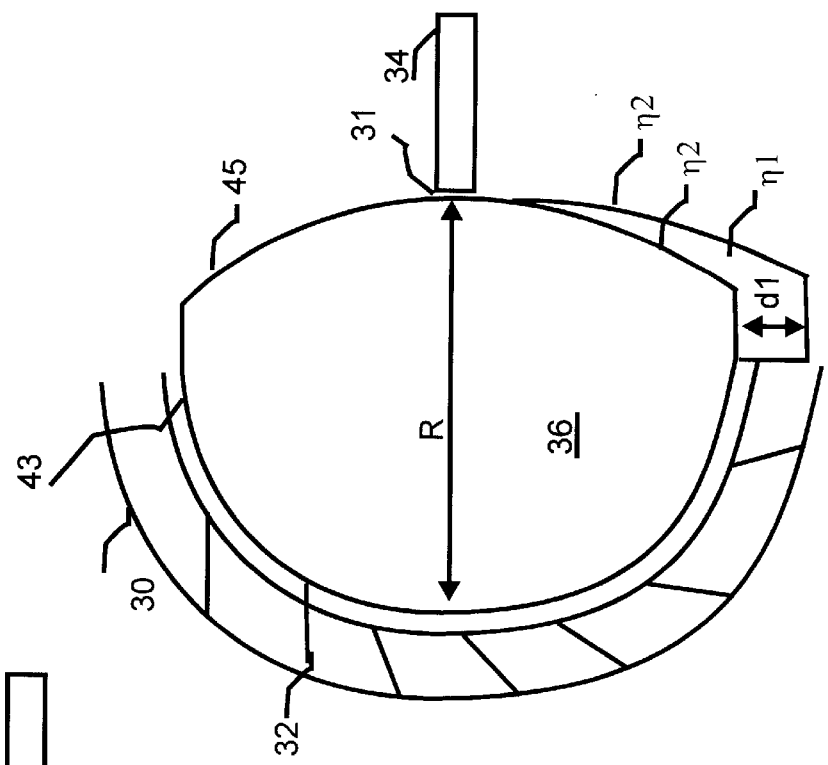
FIG. 4 is a pictorial view of an optical fiber positioned so that the fiber section containing the tilted Bragg gratings follows the circularly curved entrance end of a planar optical waveguide in order to capture the radiated light and guide and concentrate it on a distal point located on the curved exit end of the planar optical waveguide where it is coupled into another optical waveguide.
Figure 5:
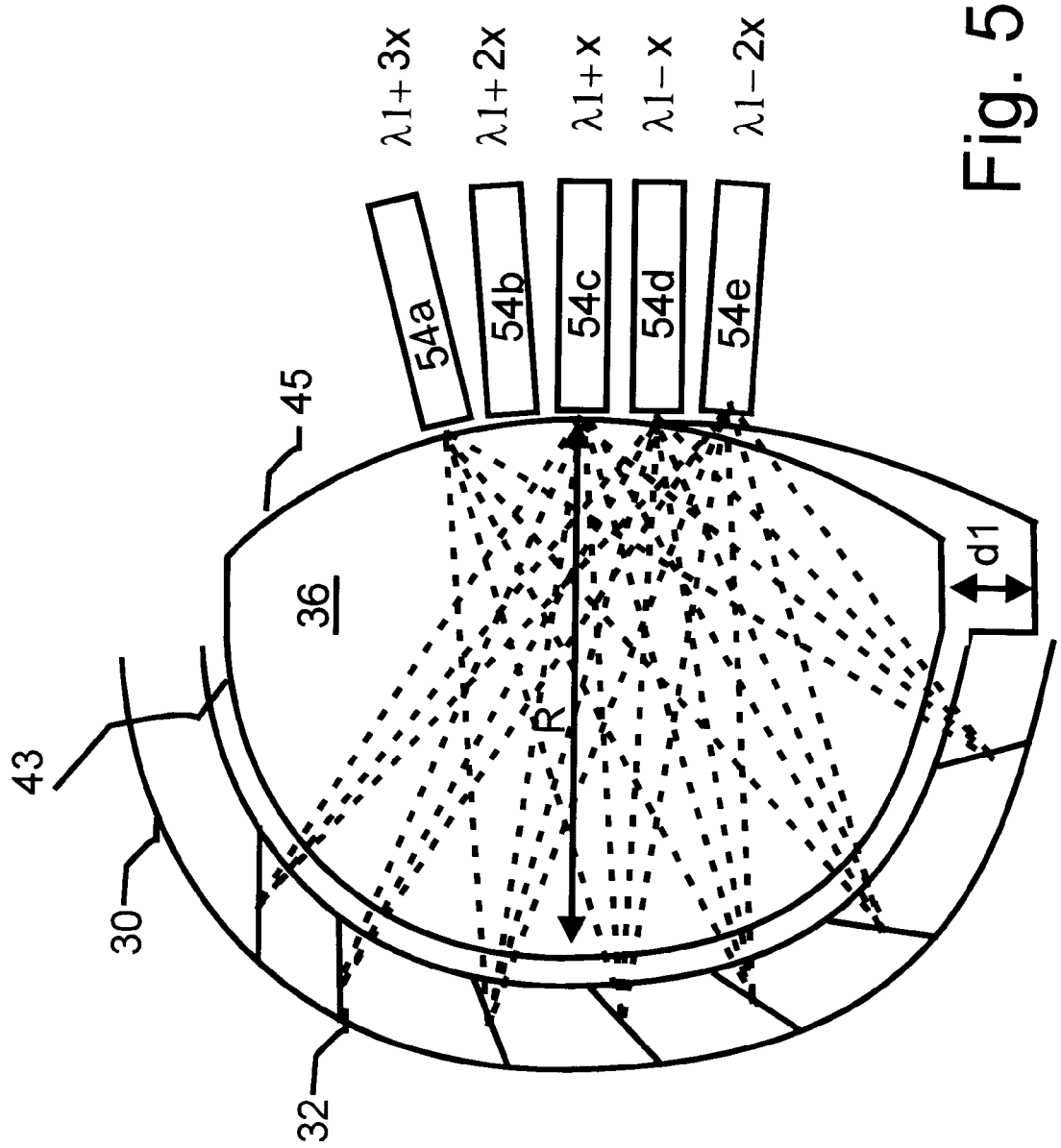
FIG. 5 is a embodiment of the invention where several different wavelengths are tapped out of an optical fiber and each individual wavelength is coupled into a different optical fibers; and, FIG. 6 show an illustration of an embodiment wherein a straight optical waveguide is utilized having a Bragg grating with a non-uniform period for coupling light out at one or more focal points.

Turning now to FIGS. 4 and 5, and in accordance with this invention, an embodiment is shown wherein light launched into a first monomode optical fiber 30 can be relatively efficiently coupled to a second monomode optical fiber 34 a distance away. As shown in the schematic in FIG. 4, the first optical fiber 30 has a slanted Bragg grating 32 impressed therein. Further, a planar optical waveguide 36 with circularly curved ends 43 and 45. The planar waveguide 36 has a central core region having thickness $d_1$ and refractive index $n_1$ and a cladding substrate and overlay regions having refractive indices $n_2$ and $n_3$ respectively. The refractive indices $n_1$, $n_2$, $n_3$ and the thickness $d_1$ of the planar optical waveguide are selected such that light propagation is in the dimension $d_1$ is substantially monomode i.e. restricted to propagation in the lowest order TE and TM modes of the slab optical waveguide. In the case of a symmetric ($n_2=n_3$) slab optical waveguide of thickness $d_1$ the condition for propagation in the lowest order TE and TM modes is that the normalized frequency $V=2\pi d_1/\lambda \sqrt{(n_1^2-n_2^2)}$ be less than $\pi/2$. Since light propagation in the plane of the slab optical waveguide is unrestricted; the planar optical waveguide acts as a free space region having only two dimensions. The curve ends 43 and 45 of the planar optical waveguide 36 are separated by a distance R. The radius of curvature, R is chosen to be sufficiently large to ensure that for an array of emitters located on the surface of the first end 43 of the planar guide 36, the surface of the other end 45 is in the far field. R is also chosen to be sufficiently small so that light absorption losses in the planar waveguide are minimized. The first optical fiber 30 is positioned so that it lies along the surface of the first curved end 43 in close contact to the planar optical waveguide 36. The fiber 30 is oriented so that the normal to the index perturbation planes is directed towards the center of the curved arc. The end of a second fiber 34 is positioned at a distal point 31 on the second curved surface 45 of the planar optical waveguide 36. The location of the distal point 31 on the curved surface 45 depends on the wavelength of the light being tapped and is the point where the light at that wavelength has its maximum concentration.

The planar optical waveguide 36 can be in the form of a glass slab having a glass core on a glass substrate with a glass or polymer over layer cladding; the refractive indices of the substrate and over layer claddings are slightly lower that the refractive index of the glass core. Alternatively the planar optical waveguide can be a polymer slab waveguide with a plastic (polymer) core on a glass or plastic substrate and a plastic over layer cladding having slightly lower refractive indices.

In operation, the light launched into the first monomode fiber 30 propagates to the region of the tilted Bragg gratings 32 where it is radiated into the end of the planar optical waveguide. Because of the close proximity of the scattering index perturbations to the end of the slab waveguide a substantial portion of the light radiated is captured and propagates in the lowest order TE and TM modes of the planar optical waveguide. Light propagation in the plane of the slab waveguide is unrestricted. However, as described previously, because of the geometric arrangement of the grating perturbations along a circular curved arc, the light intensity is concentrated at a distal point 31 where a second fiber 34 captures a substantial portion of the concentrated radiation. Thus this embodiment of the invention facilitates the tapping of light at a wavelength λ propagating in a monomode optical fiber and couples a substantial portion of the tapped light into another monomode optical fiber.

FIG. 5 shows an embodiment of the invention for tapping light propagating in a single mode fiber but having a multiplicity of different wavelengths and individually coupling light at each wavelength into a separate monomode optical fiber. This embodiment of the invention has the same design as that shown in FIG. 4 except along the second curved end 45 of the planar optical waveguide, the ends of several optical fibers 54a through 54e are positioned at predetermined distal points along curved arc. Such a device serves as a wavelength demultiplexer. Light launched into the optical fiber 30 having a plurality of wavelengths λ1−2x to λ1+3x is separated and directed to waveguides 54e to 54a respectively.

The embodiments of the invention described heretofore an optical waveguide in form of an optical fiber with a tilted grating photoimprinted in the core. It is readily apparent that invention could be implemented using integrated optic technology, in which case the optical waveguide containing the embedded grating would be a curved channel waveguide with a tilted grating in its core. The input and output ports to the device would then be via fiber optic pigtails butt coupled to the channel waveguide.

Figure 6:
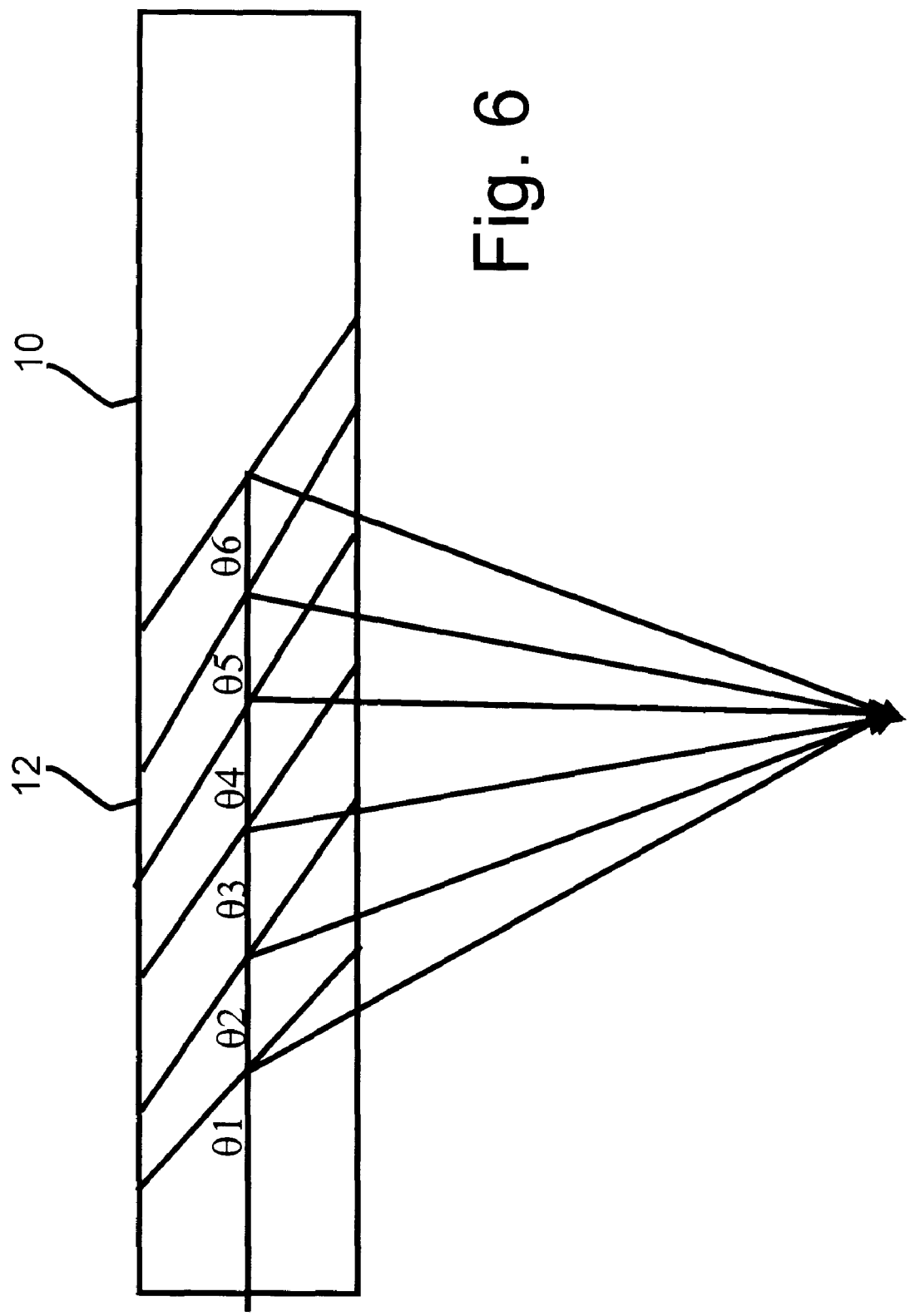

The embodiments of the invention described heretofore, rely on bending the optical waveguide at the grating to provide focusing of the light propagating through the slab waveguide. FIG. 6 shown an embodiment which more conveniently obviates bending of the waveguide. In FIG. 6 a grating is shown to have adjacent index changes which are non parallel to one another. By way of example, and for ease of explanation, only three reflective grating elements are shown at angles θ1, θ2 and, θ3 with respect to the longitudinal axis of the fibre. These angles are selected such that mono-mode light propagating within the core of the waveguide incident upon the grating elements, (regions of index difference) will focus at the point P shown. Thus, the orientation of the grating elements as shown in FIG. 6, provides the effect of bending the fiber to focus at a single point. Advantageously, this embodiment provides repeatability. A singular phase mask can be used many times to achieve a same result.

In an alternative embodiment coupling coefficient appodization is utilized in order to improve the focusing properties of the device and consequently the coupling efficiency into the receiving fibre. Apodization strength of the coupling is meant to vary in such a manner as to be strong at the centre and weak at the edges so as to produce a Gaussian wavefront.

Of course, numerous other embodiments of the invention may be envisaged without departing from the spirit and scope of the invention.

What is claimed is:

1. An optical communication system comprising:

a first mono-mode optical waveguide having a grating impressed therein, the grating having refractive index perturbations that reflect predetermined wavelengths of incident light out of a portion of a side of the optical waveguide adjacent the grating; and, a substantially planar waveguide having a first end optically coupled to the portion of the first mono-mode optical waveguide, for guiding light coupled out of the side of the waveguide, and for maintaining a uni-phase wavefront of said light by having a response that confines the light to a single mode in one dimension, and multi-mode in another dimension and allows at least a portion of the light to converge.

2. An optical communication system as defined in claim 1, further comprising a second mono-mode waveguide optically coupled to substantially mono-mode light from a second end of the substantially planar waveguide.

3. An optical communication system as defined in claim 2, further comprising means for focusing light launched into the grating, into the second mono-mode waveguide.

4. An optical communication system as defined in claim 2, wherein the grating is disposed in such a manner as to focus light of at least a predetermined wavelength incident upon it toward a distant location for coupling with the second mono-mode waveguide.

5. An optical communication system as defined in claim 2, wherein a portion of the first optical waveguide about the grating is arcuate so that light reflected from the grating outward through the waveguide will substantially focus at a point.

6. An optical communication system as defined in claim 4, wherein the substantially planar waveguide has a cladding and a core, and wherein substantially most of the light coupled into said waveguide is confined to propagate within the core.

7. An optical communication system as defined in claim 4, wherein the grating is a slanted grating and wherein the first optical waveguide is an optical fibre.

8. An optical communication system as defined in claim 4 wherein the system is a bi-directional system wherein first light of a predetermined wavelength launched into the first optical mono-mode optical waveguide is received and coupled into the second mono-mode optical waveguide and wherein light being the complex conjugate of said first light of said predetermined wavelength exiting the second optical mono-mode optical waveguide is received and coupled into the first mono-mode optical waveguide.

9. A communication system as defined in claim 1, having a plurality of substantially planar waveguides coupled to the first mono-mode optical waveguide for coupling light out of or into the first mono-mode optical waveguide.

* * * * *